United States Patent [19]

Lessard

[11] 4,297,931
[45] Nov. 3, 1981

[54] DOUBLE ENDED METAL CLEANING SHEAR

[75] Inventor: Kenneth R. Lessard, Albany, Ga.

[73] Assignee: Econ Scrap Shear Co., Albany, Ga.

[21] Appl. No.: 114,336

[22] Filed: Jan. 23, 1980

[51] Int. Cl.³ .................. B23Q 11/00; B26D 5/12
[52] U.S. Cl. .................................... 83/397; 83/544;
     83/599; 83/DIG. 1; 74/613
[58] Field of Search .................. 74/612–614;
     72/442; 83/397–398, 514–515, 544–546, 598,
     599, DIG. 1; 192/133–135

[56] References Cited

U.S. PATENT DOCUMENTS

| | | | |
|---|---|---|---|
| 1,575,325 | 3/1926 | Evans | 74/613 |
| 1,658,151 | 2/1928 | Wyrfel | 83/544 |
| 2,050,619 | 8/1936 | Malott | 192/133 |
| 2,400,639 | 5/1946 | Gayring | 192/133 |
| 2,401,808 | 6/1946 | Woodcock | 192/134 |
| 3,169,433 | 2/1965 | Stockard | 83/546 |
| 3,398,772 | 8/1968 | Klein | 83/546 |
| 3,701,276 | 10/1972 | Malmgren | 83/599 |
| 3,866,522 | 2/1975 | Oswalt | 83/599 |
| 4,078,451 | 3/1978 | Norton et al. | 74/613 |

Primary Examiner—James M. Meister
Assistant Examiner—K. Bradford Adolphson
Attorney, Agent, or Firm—Sherman Levy

[57] ABSTRACT

A metal cleaning shear is provided for shearing metals and other material wherein there is provided a rocking pivoted beam, a pivotally mounted guard, hydraulic cylinder means, cutting blades, and a control for the hydraulic means and machine.

3 Claims, 6 Drawing Figures

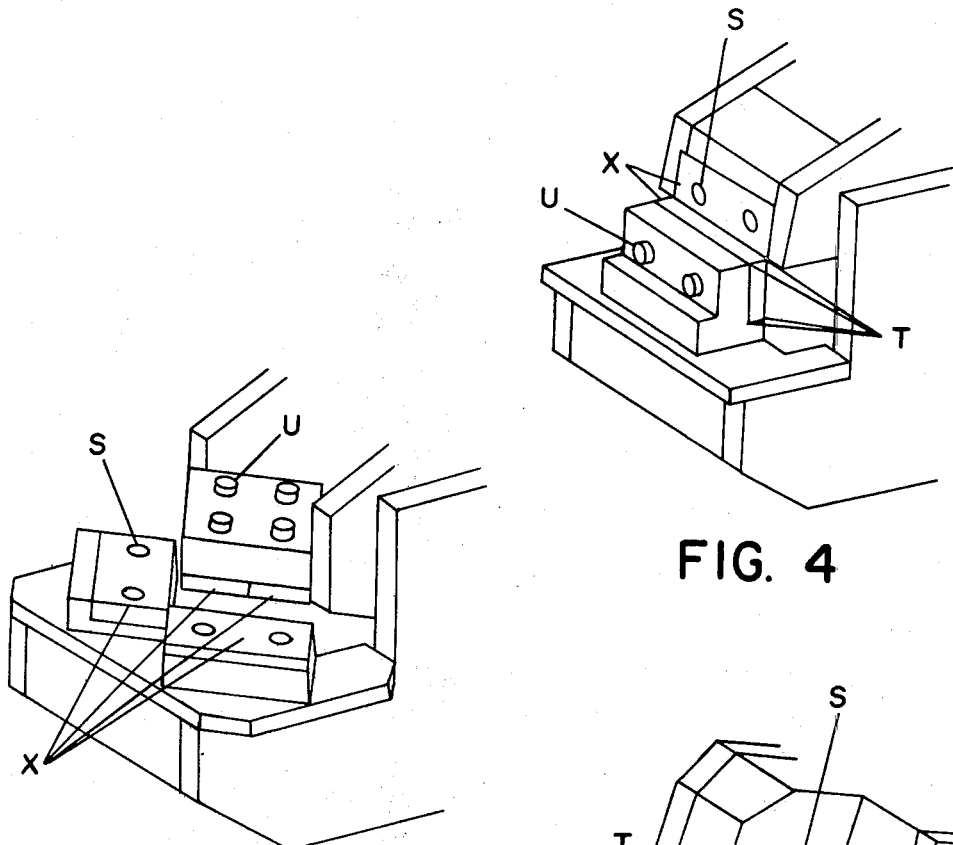
FIG. 4
FIG. 5
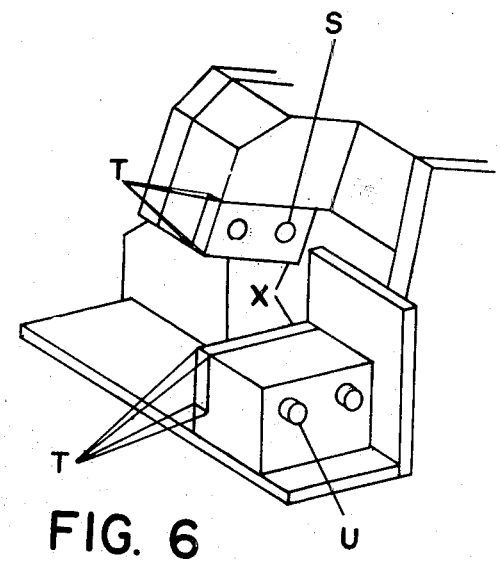
FIG. 6

DOUBLE ENDED METAL CLEANING SHEAR

FIELD OF THE INVENTION

In the past, various types of machines have been provided such as those shown in prior U.S. Pat. Nos. 657,272, 3,195,387, 3,468,206 and 3,866,522. However, neither these prior patents nor any others known to applicant accomplish the advantages that are accomplished in the present invention.

BACKGROUND AND SUMMARY OF THE INVENTION

In accordance with the present invention there is provided an apparatus or machine for shearing metals and other materials. Hydraulic power is utilized with a manual foot control which centers and stops all shearing motion whenever the operator removes his foot from the control pedal area.

The apparatus or machine of the present invention includes a rocking pivoted beam with shearing blades on both ends of the beam and matching blades on both ends of the machine bed. There is further provided a safety guard around the blades that can be rocked to completely guard the blades on one end while providing a working space guard on blades on the other end.

The present invention further includes a hydraulic cylinder for operating the cutting stroke of the blades on one end and the hydraulic operation is such that the cutting blade moves fast both up and down, and only slows down when cutting. There is also provided a rocked foot control which, when rocked in one direction causes cutting motion, and when rocked in the opposite direction causes further cutting motion, and wherein the rocked foot control centers and stops all shearing motion whenever the operator removes his foot from the control pedal.

As raw materials become limited in supply and higher in price, the recycling of used materials is increasing and more labor-saving equipment is needed in the field. Metals such as copper, brass, aluminum, steel and the like must be manually separated and sorted to be reprocessed into new material. Metal cleaning shears are used for separating these materials when joined together with unlike materials, and are also used to reduce the size of bulky materials.

It is an object of the present invention to provide metal cleaning shears which have increased versatility and efficiency as compared to previous devices and patents.

Still another object of the present invention is to provide metal cleaning shears that are ruggedly constructed and efficient to use, and which are relatively inexpensive to manufacture and operate.

Other objects of the invention are to provide a machine that has improved characteristics and advantages as compared to previous machines, and many other objects, features and advantages of this invention will be more fully realized and understood from the following detailed description when taken in conjunction with the accompanying drawings, wherein like reference numerals or letters throughout the various views of the drawings are intended to designate similar elements or components.

BRIEF DESCRIPTION OF THE DRAWINGS

FIGS. 4, 5, and 6 are detailed isometric views of three blade configurations showing blades and mountings.

DESCRIPTION OF THE PREFERRED EMBODIMENT

Referring in detail to the drawings, there is provided a machine for shearing metals and other materials that is provided with a minimum of two shearing blade configurations A and B that are mounted on a rocking pivoted beam C that is mounted from a horizontal bed or frame D with recessed blades AE and BE on both ends to match the blade configurations A and B of the rocking beam C. There is further provided a hydraulic power unit F that has a manual foot control G which centers and stops all shearing motion whenever the operator removes his foot from the control pedal G.

It will thus be seen that there has been provided a metal cleaning shear which is compact and versatile and combines any two shear blade configurations that exist today into one steel frame D that is powered by one hydraulic cylinder H from one hydraulic system F. Any suitable hydraulic power unit can be utilized for moving the blades fast up and down, but slowly when cutting.

Referring to FIGS. 4, 5, and 6 of the drawings, there is illustrated various types of blades configurations that can be utilized. For example, in FIG. 6 there is shown Alligator blades, and figure illustrates Vee blades, while FIG. 4 illustrates Nibbler blades. Other configurations of blades can be used, and any two on the ends A and B of the rocking pivoted beam C and bed D can be utilized.

Figure 1:
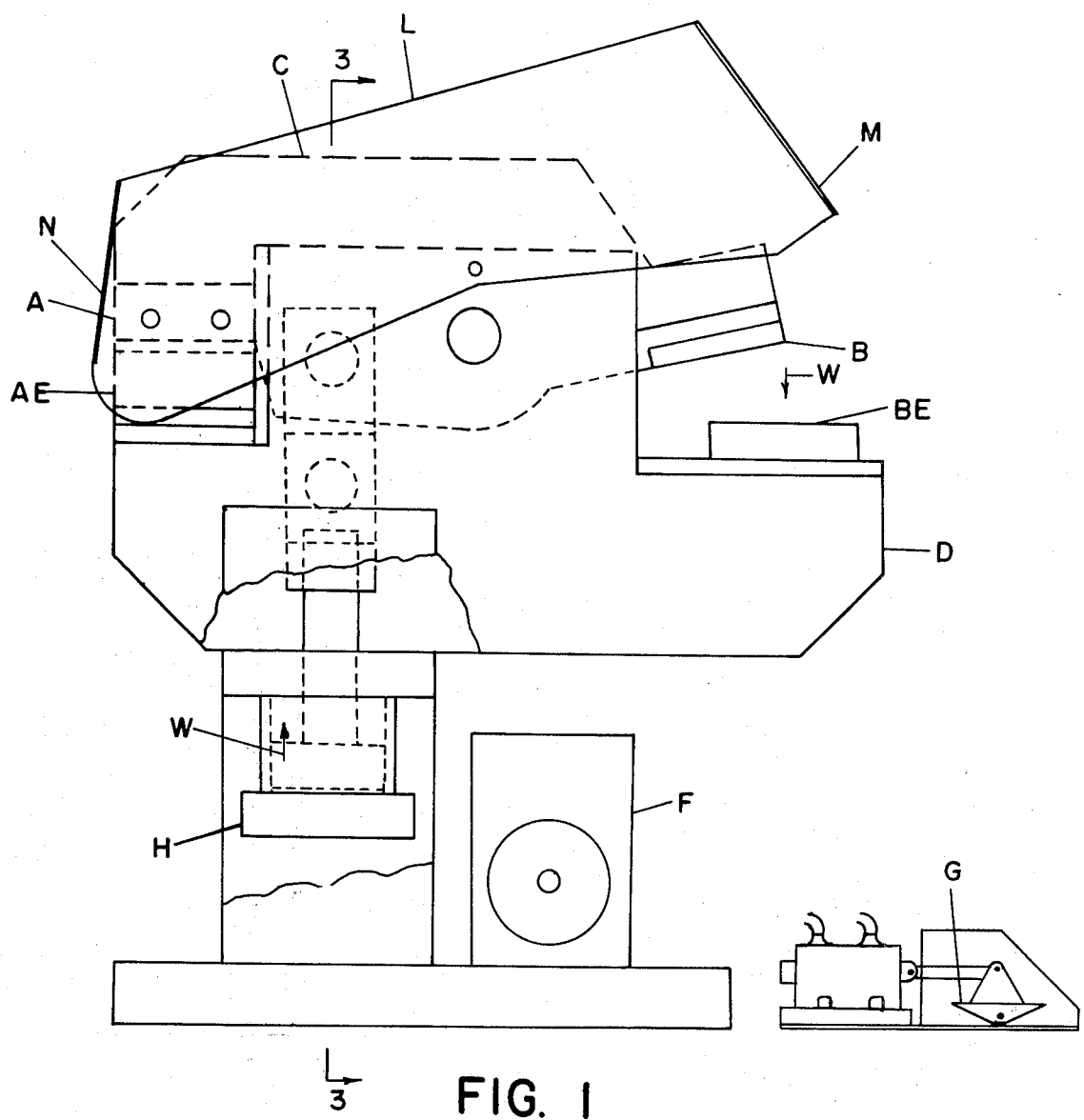
FIG. 1 is a side elevational view of the metal cleaning shear with one end operational.
Figure 2:
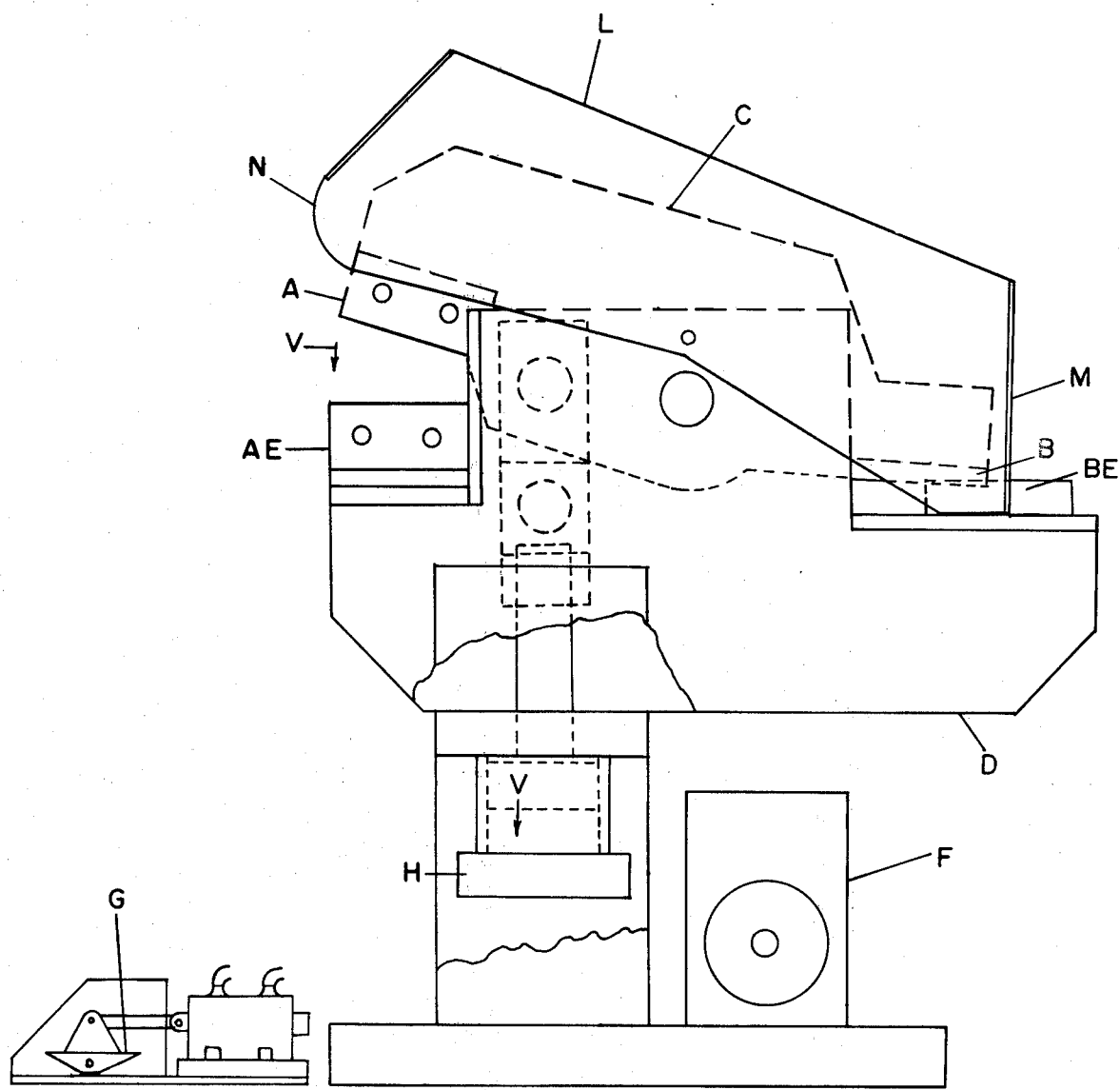
FIG. 2 is a side elevational view of the metal cleaning shear with the opposite end operational.
Figure 3:
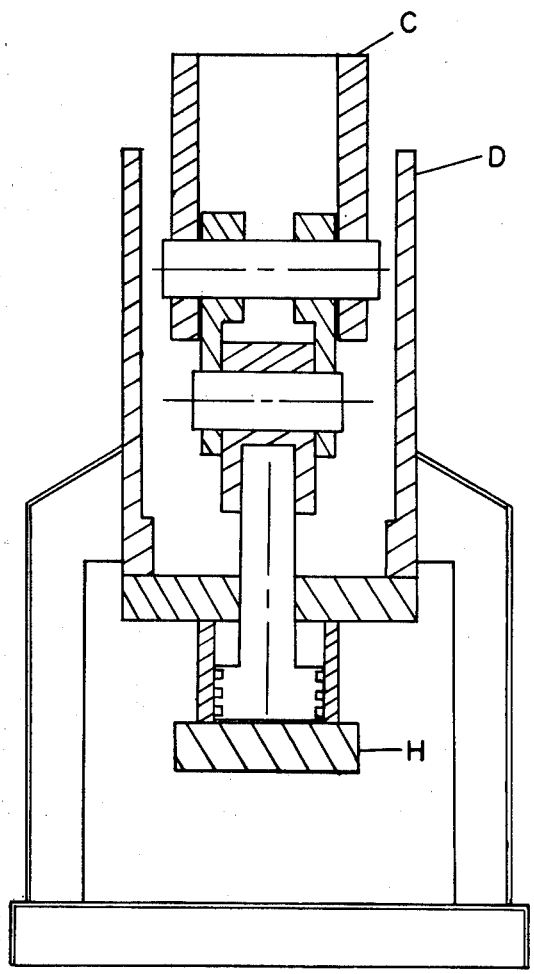
FIG. 3 is a vertical sectional view taken on the line 3—3 of FIG. 1.

In accordance with the present invention there is further provided safety guarding of the blades A and B on the two ends, and this is a novel and important feature. The safety guard L rocks on the pivoted beam C and provides a working space guard M on the end B where blades are being used, and a complete guard N on the opposite end A where the blades are not being used, as shown in FIG. 1. The guarding is reversed by simply rocking the guard L to the opposite position providing a working space guard N on end A where the blades are being used, and a complete guard M on the opposite end B where the blades are not being used, as illustrated in FIG. 2.

As shown in the drawings, the hydraulic cylinder H is obscurely tucked into the machine in such a manner so that it will not interfere with operations at either set of blades A and B. The cylinder H operation is novel, being a double acting cylinder, it operates the cutting stroke W on blades B on one end when going in one direction and operates the cutting stroke V of the blades on the other end when on the return stroke.

Further, the speed of the blade A or B is fast on both up stroke W and down stroke v and automatically slows down when cutting. This novel change in speed allows more cuts per minute by only slowing down when a cutting force is required. This speed change occurs automatically in the hydraulic power unit F.

It is to be noted that the blades A and B are novel because the same blade is interchangeably used as Alligator blades, FIG. 6, as Vee blades, FIG. 5, and as Nibbler blades, FIG. 4. The blades A and B are so designed as to use all four corners as cutting edges T, one edge at a time until all four edges T are dull. The holding of the blades in the machine is novel since the blade has a threaded hole S that a capscrew U screws into for maintaining the parts in their proper assembled position.

The parts can be made of any suitable material and in different shapes or sizes as desired or required.

Some of the important features or aspects of the present invention are as follows: There is provided the rocking pivoted beam C with the shearing blades A and B on both ends of the beam C, and matching blades on both ends of the machine bed D.

There is also provided the safety guard L around the blades A and B that can be rocked to completely guard the blades A on one end while providing a working space guard on blades B on the other end, and can be rocked to the other position to completely guard the other end blades B while leaving a working space guard on the first blades A.

The hydraulic cylinder H is arranged to operate the cutting stroke V of the cutting blades A on one end when the cylinder moves in one direction, and operate the cutting stroke W of the blades B on the opposite end when the cylinder moves on the return stroke.

The hydraulic operation F is such that the cutting blade moves fast both up and down and only slows down when cutting.

The cutting blades A and B where the same blade is interchangeably used as Alligator blades, and Vee blades, and as Nibbler blades is also an important feature. The blades have threaded holes S to hold the blade X into the metal cleaning shear with threaded capscrews U.

There is further provided the rocked type foot control G, which when rocked in one direction causes cutting motion V, and when rocked in the opposite direction causes cutting motion W, and which centers and stops all shearing motion whenever the operator removes his foot from the control pedal G, as shown in FIG. 1.

The metal cleaning shears of the present invention are adapted to be used for cutting metals apart, separating brass fittings from copper tubes, cutting a steel part out of an aluminum frame, and for performing similar jobs in the recycling industry. They are used also in the metal house in a scrap yard as well as in other industries.

The present invention utilizes a hydraulic action and is especially characterized by safety in use and operation. Thus, the hazard of flying pieces is eliminated, and hard metals can be sheared safely. The machine is foot operated, and the blade travel can be stopped or reversed at the operator's will by means of the foot pedal. Due to the provision of the blades on opposite ends of the machine, increased capacity of work can be handled.

It will therefore be seen that there has been provided a double ended metal cleaning shear which includes a base that supports a hydraulic system and a hydraulic cylinder. The hydraulic cylinder is operated remotely by the foot pedal G. The cylinder H extends through the body or bed D and operates the rocking beam C. The beam C is pivotally mounted on the body D. The beam C has at its extremities, downwardly facing blades A and B, and these blades are adapted to be secured to the beam C by capscrews U which threadedly engage holes S. The blades are constructed so as to use all four corners as cutting edges T. When the blades have their cutting edges T become dull, they can be readily replaced or sharpened. The blades, when actuated, coact with the recessed blades AE and BE respectively to accomplish the shearing action. The blades A and B may be interchanged with Nibbler blades shown in FIG. 4, Vee blades of FIG. 5, and/or Alligator blades shown in FIG. 6. The safety guard L is pivotally attached to the rocking beam C by suitable pivot pin. The guard L permits access to the blade that is about to shear, and the guard L prevents access to the blade that is already sheared.

In operation, the operator depresses the manual foot control G. The hydraulic cylinder H can ascend, causing the rocking arm C to pivot so that the attached blade B is forced downward into contact with the recessed blade BE. The safety guard L pivots on a suitable pivot pin, and covers the blade B and exposes the blade A. The blade A, as the result of the ascent of the hydraulic cylinder H rises and loses contact with the recessed blade AE. When the hydraulic cylinder H is allowed to descend, the blade A comes down and into contact with the recessed blade AE, and the safety guard L pivots on its pivot pin to cover the blade A, and the blade B is again exposed.

While several embodiments of the present invention have been illustrated herein in particular detail, it will be understood that variations and modifications may be effected without departing from the spirit and scope of the novel concepts of this invention.

What is claimed:

1. In a double ended metal cleaning shear, a horizontally disposed bed, a rocking beam pivotally and rockably mounted on said bed, recessed blades on each end of said bed, shearing blades on both ends of said rocking beam matching and coacting with the recessed blades of the bed, a hydraulic power unit operatively connected to said beam for selectively causing shearing action between the blades on the beam and the blades on the bed, foot control pedal means for controling said hydraulic power unit, and a single safety guard rockably mounted on said pivoted beam, and wherein the safety guard can be rocked to completely guard blades on one end while providing a working space guard on blades on the opposite end, and wherein the safety guard can be rocked to another position to completely guard the other end blades while leaving a working space guard on the first named blades, and wherein the hydraulic power unit includes a cylinder for operating the cutting stroke of the blades on one end when the cylinder moves in one direction and operates the cutting stroke of the blades on the opposite end when the cylinder moves on the returning stroke.

2. The structure as defined in claim 1 wherein the cutting blades are interchangeably mounted, and wherein the blades have threaded holes, and screw members extending into said holes and maintaining the blades in the assembled relation.

3. The structure as defined in claim 2 wherein the foot control pedal means includes a rocking foot control which when rocked in one direction causes cutting motion, and when rocked in the opposite direction also causes cutting motion wherein the foot control centers and stops all shearing motion whenever the operator removes his foot from the control pedal of the machine.

* * * * *